United States Patent
Su et al.

(10) Patent No.: US 6,312,825 B1
(45) Date of Patent: *Nov. 6, 2001

(54) HIGH BARRIER MULTI-LAYER FILM

(75) Inventors: Tien-Kuei Su, Fairport, NY (US); Shaw-Chang Chu, Princeton Junction, NJ (US); Jay K. Keung, Singapore (SG)

(73) Assignee: ExxonMobil Oil Corporation, Fairfax, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,767

(22) Filed: Sep. 21, 1998

(51) Int. Cl.$^7$ ........................................... B32B 27/32
(52) U.S. Cl. ........................ 428/484; 428/516; 428/520; 428/910; 264/173.15
(58) Field of Search .................... 428/520, 515, 428/516, 484, 518, 910; 264/173.15

(56) References Cited

U.S. PATENT DOCUMENTS

| | | | |
|---|---|---|---|
| 4,377,616 | 3/1983 | Ashcraft et al. | 428/213 |
| 4,590,125 | 5/1986 | Balloni et al. | 428/349 |
| 5,141,801 | 8/1992 | Takeshita et al. | 428/348 |
| 5,155,160 | 10/1992 | Yeh et al. | 524/487 |
| 5,302,327 | * 4/1994 | Chu et al. | 294/22 |
| 5,759,648 | 6/1998 | Idlas | 428/34.9 |
| 5,858,552 | * 1/1999 | Bader et al. | 428/516 |
| 6,033,771 | * 3/2000 | Heffelinger | 428/320.2 |

* cited by examiner

Primary Examiner—Paul Thibodeau
Assistant Examiner—D. Lawrence Tarazano
(74) Attorney, Agent, or Firm—Dennis P. Santini

(57) ABSTRACT

A multi layer film having enhanced barrier properties with respect to oxygen and water vapor transmission as well as an excellent surface for film laminating, printing and coating processes is provided. The multi layer film includes a polyolefin core layer having a wax therein, a first surface layer including a polyolefin copolymer or terpolymer layer, and a second surface layer including a polar layer having ester functionality. Multi layer films according to the present invention are particularly useful as packaging films for food products, and are particularly well suited for subsequent laminating, printing or coating operations.

11 Claims, No Drawings

HIGH BARRIER MULTI-LAYER FILM

FIELD OF THE INVENTION

The present invention relates to multi layer packaging films having enhanced barrier characteristics, and which are particularly useful as packaging films for food products, and are successful in laminating, printing or coating operations.

BACKGROUND OF THE INVENTION

Plastic materials such as polymeric films have been widely used for packaging various food and non-food products. In order to insure proper preservation of products packaged in such polymeric films, it is necessary to provide the films with barriers against transmission of air, moisture, deleterious flavors, etc. No single unmodified polymeric film, however, has sufficient gas and moisture barrier characteristics needed for proper packaging requirements. For example, polyolefin films such as polypropylene films are particularly preferred in the manufacture of packaging films due to their low cost and ease of manufacture. Such polypropylene films, however, inherently permit the transmission of oxygen and water vapor from the outside of the film to the inside of the package made up of the film. When such films are used as food packagings, oxygen and water vapor transmitted therethrough promote rapid deterioration of foods packaged therein.

In order to provide acceptable barrier properties, multi layer polymeric films have been developed having improved water vapor transmission rates (WVTR). For example, polyvinylidene chloride (PvdC) coatings have been used to impart gas and moisture barrier properties to thermoplastic films. PVdC, however, tends to degrade rapidly under typical film reprocessing temperatures, resulting in poor quality recycle products. Further, incorporating wax into film structures has been known to improve water vapor transmission rates. It is believed that the wax migrates or blooms to the outside surface of the film structure and becomes crystalline, thus imparting superior WVTR and improved oxygen barrier properties. In this approach, however, the wax on the surface is susceptible to removal, thereby presenting difficulty in maintaining such WTVR and oxygen barrier properties, particularly when such films are used in laminating, printing and coating operations.

In order to provide a film having improved barrier properties, U.S. Pat. Nos. 5,141,801 and 5,155,160 disclose incorporating a wax into a polyolefin surface layer of a co-extruded film. To prevent migration of the wax to a surface which is to be used in lamination and printing, these patents suggest incorporating a barrier layer of polymeric material such as a polyamide or an ethylene vinyl alcohol copolymer (EVOH). Such polyamide and EVOH barrier layers, however, are expensive and difficult to manufacture, and are very sensitive to moisture. Thus, while the prior art discloses various useful films, such films are typically susceptible to removal of the wax during subsequent laminating, printing and coating processes, and are difficult and expensive to manufacture.

Accordingly, a need exists for a packaging film which is simple and inexpensive to manufacture, which is capable of providing enhanced barrier properties to oxygen and water vapor transmission, and which is capable of subsequent laminating, printing or coating procedures.

SUMMARY OF THE INVENTION

It is an object of the present invention to provide a packaging film having improved oxygen and water vapor barrier properties.

It is a further object of the present invention to provide a packaging film which is efficient in laminating, printing or coating operations.

These and other objects are achieved in the present invention which provides a multi layer film having a polyolefin core layer incorporating a wax therein; a first surface layer including a polyolefin copolymer or terpolymer layer; and a second surface layer including a polar layer having ester functionality. The polyolefin core layer is preferably polypropylene including a Fischer Tropsch wax which is preferably present in an amount of about 4% to about 8% by weight of said polyolefin core layer.

The first surface layer is preferably an ethylene/propylene copolymer or an ethylene/propylene/butene terpolymer. The second surface layer is preferably selected from the group consisting of ethylene vinyl acetate copolymer and anhydride-grafted polypropylene. Most preferably, the film is a three layer biaxially oriented film having a polyolefin core layer including a first surface and a second surface and incorporating a wax therein; a first surface layer of a polyolefin copolymer or terpolymer layer adjacent the first surface of the polyolefin core layer which forms a moisture barrier surface of the film; and a second surface layer of a polar layer having ester functionality adjacent the second surface of the polyolefin core layer which forms an oxygen barrier surface of the film.

The present invention also provides for a method or preparing such a multilayer film, which method involves co-extruding a first polyolefin resin incorporating a wax therein, a second polyolefin copolymer or terpolymer resin, and a third polyolefin resin of a polar material having ester functionality to form a multi layer base film having a polyolefin core layer including the wax, a copolymer or terpolymer surface layer on a first surface of the polyolefin core layer, and a polar surface layer having ester functionality on the second surface layer of the polyolefin core layer. The method further involves biaxially orienting the multi-layer base film at conditions sufficient to cause the wax to migrate from the polyolefin core layer to the copolymer or terpolymer surface layer of the film.

Thus, it has been discovered herein that a multi layer film incorporating a polyolefin core layer having a wax therein, a first surface layer including a polyolefin copolymer or terpolymer layer, and a second surface layer including a polar layer having ester functionality, provides excellent WVTR and oxygen barrier properties and provides an excellent surface for film laminating, printing and coating processes.

DETAILED DESCRIPTION OF THE PREFERRED EMBODIMENT

The present invention is directed to a multi layer film structure incorporating a polyolefin core layer including a wax, a first surface layer of a polyolefin copolymer or terpolymer, and a second surface layer of a polar material having ester functionality. The film structure of the present invention provides excellent WVTR and oxygen barrier properties, while permitting laminating, printing and coating of the film structure without deleterious effects on the WVTR and oxygen barrier properties.

The polyolefin core layer contemplated by the present invention can be any suitable polyolefin polymer useful in the manufacture of thermoplastic films. Particularly preferred polyolefin polymers include propylene homopolymers and copolymers. Propylene homopolymers of particular use include 80–100% isotactic polypropylene, most preferably 95–96% isotactic polypropylene. Preferably, the propylene homopolymers have a melt index ranging from about 2 to about 10 grams/10 minutes and most preferably a melt index of from about 3.5 to about 6 grams/10 minutes. Preferred propylene copolymers include 98–96/2–4 propylenelethylene copolymers, 50/50 propylene/butene-1 copolymer, 95/5 propylene/1-pentene copolymer, 90/10 propylene/1-hexene copolymer, 80/20 propylene/4-methyl-1-pentene copolymer, etc.

A crystalline wax is incorporated into the polyolefin core layer of the multi layer film. During manufacture of the film, the wax migrates from the polyolefin core layer into the polyolefin copolymer or terpolymer surface layer, as will be discussed in more detail herein. The wax imparts superior WVTR and improved oxygen barrier properties to the film. The wax is preferably a hydrocarbon wax, such as a mineral wax or a synthetic wax. More preferably, the wax is a polyethylene or polypropylene wax. Particularly preferred waxes are polypropylene waxes prepared according to the Fischer-Tropsch process, commonly referred to as Fischer Tropsch waxes, preferably having an average molecular weight of about 640 and a melting point of about 80° C.

The amount of wax incorporated into the film structure depends on the thickness of the overall film structure as well as the type of polyolefin layers. The wax is preferably present in the polyolefin core layer in an amount of about 2% to about 20% by weight, more preferably between about 4% and about 8% by weight, and most preferably about 6% by weight. Amounts in excess of about 20% tend to produce film structures which are weak.

The film structure of the present invention includes a first surface layer or "skin" layer of a polyolefin copolymer or terpolymer. The first surface layer is preferably adjacent the polyolefin core layer. Examples of suitable polyolefin copolymers or terpolymers include without limitation ethylene-propylene (EP) copolymer and ethylene-propylene-butene-1 (EPB) terpolymer. The ratio of ethylene to propylene with an ethylene-propylene copolymer is preferably about 2–4% by weight ethylene and from about 96% to about 98% by weight polypropylene, while the ratio of ethylene to propylene to butene-1 for ethylene-propylene-butene-1 terpolymer is preferably from about 0–15% ethylene, 70–100% propylene and 0–15% butene-1.

The first surface layer may include voids therein, commonly referred to as "cavitations", thus providing a voided or cavitated film layer. Incorporating voided or cavitated layers into multi layer film structures is known in the art, for instance, as described in U.S. Pat. No. 4,377,616 to Ashcraft et al., incorporated herein by reference. Typically, such voids are formed by incorporating void-initiating particles or particulate material into the resin which forms the film layer. By including such particulate material in the resin, the film layer is formed including the particulate material dispersed throughout the layer. Upon orientation of the layer, the dispersed particulate material causes a strata of voids to form at the location of the particulate material, as will be discussed in more detail herein. Such voids typically impart a high degree of opacity to the film.

The void-initiating particles can be any material which is capable of forming voids in the intermediate layer without causing degradation to the film material, such as those materials described in U.S. Pat. No. 4,337,616. Preferably, the void-initiating particles are thermoplastic resins with a higher melting point than the polymer of the layer in which they are incorporated. Examples of preferred materials include polyamides, nylons, polyesters, acrylic resins, etc. Most preferably, the void-initiating material is polybutylene terephthalate (PBT). Preferably, the PBT is incorporated into the resin which forms the first surface layer in an amount of about 4–15%, most preferably about 6–10%.

The film structure of the present invention further includes a second surface layer of a polar material having ester functionality. Preferably, the second surface layer is selected from the group consisting of ethylene vinyl acetate copolymer and anhydride-grafted polypropylene. It has been discovered through the present invention that such polar materials having ester functionality are capable of providing oxygen barrier properties as well as providing an effective barrier to block migration of the wax from the core layer to the surface of the film due to the chemical properties of the surface layer, thereby providing a surface which is suitable for subsequent printing or laminating processes.

More particularly, the wax incorporated in the core layer of the multi layer film is non-polar. In order to provide a chemical barrier to the migration of this wax, a polar surface layer may be used. As noted above, U.S. Pat. No. 5,141,801 discloses films which incorporate a polyamide (nylon) or ethylene-vinyl alcohol copolymer (EVOH) layer to prevent migration of the wax and therefore provide a printable surface. While such polar materials provide effective barriers to prevent wax migration, these materials are very sensitive to moisture. Thus, the effectiveness of the oxygen barrier properties is diminished due to this moisture sensitivity.

On the other hand, it has been discovered through the present invention that effective barriers to prevent wax migration can be achieved without compromising the oxygen barrier properties of the film by incorporating as a surface layer a polar material having ester functionality. While the exact mechanisms of the films according to the present invention are not completely understood, it is contemplated by the present inventors that the functional groups of the nylon and EVOH layers of the prior art films, namely amide functionality and hydroxy functionality, react with moisture, for example moisture in the air or in the product packaged by the film, to deteriorate the functional groups. On the other hand, the ester functional groups incorporated in the polar surface layer of the films according to the present invention are not particularly sensitive to moisture, and therefore are not deteriorated in the same manner as the hydroxy and amide functional groups of the nylon and EVOH layers, respectively. Thus, the polar surface layer of the multi layer film provides an effective barrier against migration of the wax to the surface, thus providing an effective surface for lamination or printing. Moreover, the film retains its oxygen barrier properties due to the ester functionality of the polar material which provides a surface layer which is not moisture sensitive.

The multi layer films of the present invention are therefore capable of providing an effective moisture barrier through the migration of the wax to the copolymer or terpolymer surface layer, as well as, providing an oxygen barrier and an effective surface for laminating, printing or coating through the chemical barrier created by the EVA or anhydride-grafted polypropylene layer.

The multi layer film structure of the present invention is preferably a three layer film structure including the polyolefin core layer incorporating a wax therein as the core layer having two opposing surfaces thereof, the polyolefin copolymer or terpolymer as a first surface layer on the first surface of the polyolefin core layer, and the polar layer having ester functionality as a second layer on the second surface of the polyolefin core layer. Alternatively, the multi layer film structure may include additional layers, for example, intermediate layers or "tie" layers present between the polyolefin core layer and either one or both of the surface layers. For example, the multi layer film structure may be a five layer film structure including the polyolefin core layer incorporating a wax therein as the core layer, a polyolefin copolymer or terpolymer intermediate layer on both surfaces of the core layer, and a polyolefin copolymer or terpolymer as a first surface layer adjacent one of the intermediate layers and the polar layer having ester functionality as a second surface layer on the other intermediate layer. Thus, in such an embodiment, the polyolefin core layer incorporating the wax therein remains the core of the film structure, and the surfaces of the film structure are represented by the polyolefin copolymer or terpolymer and the polar layer having ester functionality, respectively. The intermediate layers may further be voided or cavitated, as described hereinabove. In such alternate embodiments incorporating intermediate layers, it is preferred that the intermediate layers are cavitated such that the wax can migrate into the cavitations or voids during orientation of the film structure, as is detailed in U.S. application Ser. No. 08/895510 entitled "Improved WVTR Film Using Wax In Combination With A Cavitated Tie Layer", the disclosure of which is incorporated herein by reference.

The multi layer films of the present invention are preferably 0.5 to 1.25 mils in total thickness. The polyolefin core layer preferably represents about 50–85 percent of the total thickness of the film, with the first copolymer or terpolymer surface layer preferably representing about 5–45 percent and the second ester-functional polar layer preferably representing about 5–45 percent of the total thickness.

The films of the present invention can be clear or opaque. Preferably, the film is opaque, with such opacity attributed to cavitations appearing in the copolymer or terpolymer surface layer.

Preferably, the moisture barrier or water vapor barrier of the present inventive film is below a transmission rate of 0.25 grams per 100 square inches per day, at conditions of 100° F. temperature and ambient relative humidity, and most preferably below a transmission rate of 0.2 grams per 100 square inches per day.

The multi layer film structure of the present invention is preferably a coextruded film wherein different resins form specific layers of the film structure. The present invention also relates to a method of producing a multi layer oriented film structure having excellent barrier properties against the transmission of oxygen and water vapor. In the method, three polyolefin resins are co-extruded to provided a multi layer base film structure having film layers corresponding to the polyolefin resins. The first polyolefin resin is a core layer-forming resin which provides for the polyolefin core layer which, as noted above, is preferably a polypropylene homopolymer. The crystalline wax is blended or incorporated into the core layer-forming polyolefin resin.

The second polyolefin resin is a first surface layer-forming resin which provides for the first surface layer of the film in the form of a polyolefin copolymer or terpolymer. As noted, this copolymer or terpolymer surface layer may include voids or cavitations therein. In order to provide for such voids or cavitations, the second polyolefin resin which forms this first surface layer may include void-initiating particles or particulate material incorporated therein.

The third polyolefin resin is a surface layer-forming resin which provides for the polar surface layer having ester functionality, such as ethylene-vinyl acetate copolymer or anhydride grafted polypropylene.

The three polyolefin resins are coextruded to form a multi layer base film structure having a core layer incorporating a wax therein, a first surface layer of a copolymer or terpolymer on a first surface of the core layer, and a second surface layer of a polar material having ester functionality on the second surface layer of the core material. As such, the three polyolefin resins are coextruded to form a three layer base film structure as indicated. Alternatively, the polyolefin resins can be coextruded with additional resins to form multi layer films, as described above. For example, an intermediate layer may be incorporated between the polyolefin core layer and the first and/or second surface layers.

The multi layer base film structure thus formed represents a transitional or interim product, which is then subjected to orientation to produce a multi layer oriented film product. Orientation of such extruded base films is well known in the art, and results in improved physical properties of the composite layers such as flex-cracking resistance, Elmendorff tear strength, elongation, tensile strength, impact strength and cold strength properties. In addition to these improved physical properties, in the present invention, orientation of the multi layer base film structure provides for migration of the wax from the core layer into the copolymer or terpolymer surface layer. Further, in embodiments incorporating cavitated or voided layers, such orientation further provides for cavitation of the copolymer or terpolymer surface layer and/or the intermediate layers, if any. For example, orientation of the multi layer base film structure is conducted at orientation conditions such that the void-initiating particles in the surface and/or intermediate layers create voids within the structure of these layer, as described in the incorporated U.S. Pat. No. 4,377,616.

Preferably, the film is biaxially oriented 4–6 times in the machine direction and 7–12 times in the transverse direction, more preferably 4–5.5 times in the machine direction and 8–10 times in the transverse direction. Further, orientation of the multi layer base film structure is conducted at conditions which cause the wax incorporated into the core layer to become mobile, thereby causing the wax to flow or migrate. Preferably, orientation of the film is conducted at a temperature of approximately 100° C. to 160° C.

With the copolymer or terpolymer surface layer adjacent the surface of the wax-containing core layer, the orientation of the film causes the wax within the core layer to become fluid and mobile within the film structure, and the mobile wax migrates from the core layer into the copolymer or terpolymer first surface layer. As the oriented film cools, the mobile wax crystallizes within this layer. It is contemplated that a portion of the wax remains within the core layer of the film structure.

As such, this multi layer oriented film product can be subsequently utilized in lamination or printing procedures. For example, the multi layer oriented film product is exceptionally well suited for lamination to oriented polypropylene films for use in packaging applications.

The invention may be further understood with reference to the following non-limiting examples.

EXAMPLE 1

Example 1, representing a comparative example, demonstrates the effects of incorporating a wax into the core of a three layer film structure having a polypropylene homopolymer core layer, and ethylene-propylene copolymer layers on both surfaces of the core layer.

Three separate three layer film products were prepared each as follows: A polypropylene homopolymer resin was blended with 6% of a Fischer Tropsch wax having a melting point of 80° C. This polypropylene/wax resin blend was co-extruded with two separate ethylene-propylene copolymer resins, to form a three layer base film structure having a polypropylene homopolymer core layer incorporating 6% wax therein, and ethylene-propylene copolymer surface layers on both surfaces of the core layer, with the core layer representing 80% of the total thickness of the three layer base film structure and the surface layers each representing 10% of the total thickness of the three layer base film structure. The three layer base film structure was biaxially oriented 4–5 times in the machine direction and 8–10 times in the transverse direction as is well known in the art, to produce the clear three layer film product.

Subsequent to this orientation, each of the three separate three layer film products thus produced were laminated to a two-sided treated oriented polypropylene film of 50 gauge thickness, the first using a water based adhesive, the second using a solvent based adhesive, and the third using a polyethylene melt adhesive.

The three laminated film products were then aged in a hot room at 120° F. and ambient humidity for a period of 72 hours, and tested for water vapor transmission according to ASTM method F124-90, and bond strength according to Mobil method NAF-OPP-4.10-QCT-3-416.

Each of the three laminated film products demonstrated acceptable water vapor transmission rates as follows: 0.16 g/100 in$^2$/day for the film laminated with a water based adhesive; 0.18 g/100 in$^2$/day for the film laminated with a solvent based adhesive; and 0.19 g/100 in$^2$/day for the film laminated with a polyethylene melt adhesive. Each of the three laminated film products, however, demonstrated poor bond strength, with the film laminated with a water based adhesive having a bond strength of 9 grams, the film laminated with a solvent based adhesive having a bond strength of 3 g, and the film laminated with a polyethylene melt adhesive having a bond strength of 50 g.

EXAMPLE 2

Example 2, also representing a comparative example, demonstrates the effects of incorporating a wax into the core of a three layer film structure having a polypropylene homopolymer core layer, and ethylene-propylene-butene terpolymer layers on both surfaces of the core layer.

Three separate three layer film products were prepared each as follows: A polypropylene homopolymer resin was blended with 6% of a Fischer Tropsch wax having a melting point of 80° C. This polypropylene/wax resin blend was co-extruded with two separate ethylene-propylene-butene terpolymer resins, to form a three layer base film structure having a polypropylene homopolymer core layer incorporating 6% wax therein, and ethylene-propylene-butene terpolymer surface layers on both surfaces of the core layer, with the core layer representing 80% of the total thickness of the three layer base film structure and the surface layers each representing 10% of the total thickness of the three layer base film structure. The three layer base film structure was biaxially oriented 4–5 times in the machine direction and 8–10 times in the transverse direction as is well known in the art, to produce the clear three layer film product.

Subsequent to this orientation, each of the three separate three layer film products thus produced were laminated to a two-sided treated oriented polypropylene film of 50 gauge thickness, the first using a water based adhesive, the second using a solvent based adhesive, and the third using a polyethylene melt adhesive.

The three laminated film products were then aged in a hot room at 120° F. and ambient humidity for a period of 72 hours, and tested for water vapor transmission according to ASTM method F124-90, and bond strength according to Mobil method NAF-OPP-4.10-QCT-3-416.

The film products which were laminated with a water based adhesive and a solvent based adhesive demonstrated excellent water vapor transmission rates of 0.11 g/100 in$^2$/day, while the film product laminated with a polyethylene melt adhesive demonstrated a marginally acceptable water vapor transmission rate of 0.21 g/100 in$^2$/day. All three of the laminated film products, however, demonstrated poor bond strength, with the film laminated with a water based adhesive having a bond strength of 10 grams, the film laminated with a solvent based adhesive having a bond strength of 3 g, and the film laminated with a polyethylene melt adhesive having a bond strength of 10 g.

EXAMPLE 3

Example 3 represents a film structure according to the present invention, incorporating a wax into the core of a three layer film structure having a polypropylene homopolymer core layer, an ethylene-propylene-butene terpolymer layer on one surface of the core layer, and an anhydride grafted polypropylene polymer on the other surface of the core layer.

Three separate three layer film products were prepared each as follows: A polypropylene homopolymer resin was blended with 6% of a Fischer Tropsch wax having a melting point of 80° C. This polypropylene/wax resin blend was co-extruded with an ethylene-propylene-butene terpolymer resin and an anhydride-grafted polypropylene polymer resin, to form a three layer base film structure having a polypropylene homopolymer core layer incorporating 6% wax therein, an ethylene-propylene-butene terpolymer surface layer on one surface of the core layer, and an anhydride-grafted polypropylene polymer on the other surface of the core layer. The core layer represents 85% of the total thickness of the three layer base film structure, the ethylene-propylene-butene terpolymer surface layer represents 10% of the total thickness of the three layer base film structure, and the anhydride-grafted polypropylene polymer surface layer represents 5% of the total thickness of the three layer base film structure. The three layer base film structure was biaxially oriented 4–5 times in the machine direction and 8–10 times in the transverse direction as is well known in the art, to produce the clear three layer film product.

Subsequent to this orientation, each of the three separate three layer film products thus produced were laminated to a two-sided treated oriented polypropylene film of 50 gauge thickness, the first using a water based adhesive, the second using a solvent based adhesive, and the third using a polyethylene melt adhesive.

The three laminated film products were then aged in a hot room at 120° F. and ambient humidity for a period of 72 hours, and tested for water vapor transmission according to ASTM method F124-90, and bond strength according to Mobil method NAF-OPP-4.10-QCT-3-416.

The film products which were laminated with a water based adhesive and a solvent based adhesive demonstrated excellent water vapor transmission rates of 0.14 g/100 in$^2$/day and 0.12 g/100 in$^2$/day, respectively, while the film product laminated with a polyethylene melt adhesive demonstrated a marginally acceptable water vapor transmission rate of 0.21 g/100 in$^2$/day. Further, The film products which were laminated with a water based adhesive and a solvent based adhesive demonstrated poor bond strengths of 16 grams and 6 g, respectively. The film laminated with a polyethylene melt adhesive demonstrated an excellent bond strength of 510 g.

EXAMPLE 4

Example 4 represents a film structure according to a further embodiment of the present invention, incorporating a wax into the core of a three layer film structure having a polypropylene homopolymer core layer, an ethylene-propylene copolymer layer on one surface of the core layer, and an ethylene-vinyl acetate copolymer on the other surface of the core layer.

Three separate three layer film products were prepared each as follows: A polypropylene homopolymer resin was blended with 6% of a Fischer Tropsch wax having a melting point of 80° C. This polypropylene/wax resin blend was co-extruded with an ethylene-propylene copolymer resin and an ethylene-vinyl acetate copolymer resin, to form a three layer base film structure having a polypropylene homopolymer core layer incorporating 6% wax therein, an ethylene-propylene copolymer surface layer on one surface of the core layer, and an ethylene-vinyl acetate copolymer on the other surface of the core layer. The core layer represents 85% of the total thickness of the three layer base film structure, the ethylene-propylene copolymer surface layer represents 10% of the total thickness of the three layer base film structure, and the ethylene-vinyl acetate copolymer surface layer represents 5% of the total thickness of the three layer base film structure.

The three layer base film structure was biaxially oriented 4–5 times in the machine direction and 8–10 times in the transverse direction as is well known in the art, to produce the clear three layer film product.

Subsequent to this orientation, each of the three separate three layer film products thus produced were laminated to a two-sided treated oriented polypropylene film of 50 gauge thickness, the first using a water based adhesive, the second using a solvent based adhesive, and the third using a polyethylene melt adhesive.

The three laminated film products were then aged in a hot room at 120° F. and ambient humidity for a period of 72 hours, and tested for water vapor transmission according to ASTM method F124-90, and bond strength according to Mobil method NAF-OPP-4.10-QCT-3-416.

Each of the three laminated film products demonstrated acceptable water vapor transmission rates as follows: 0.19 g/100 in$^2$/day for the film laminated with a water based adhesive; 0.17 g/100 in$^2$/day for the film laminated with a solvent based adhesive; and 0.20 g/100 in$^2$/day for the film laminated with a polyethylene melt adhesive. Further, each of the three laminated film products demonstrated good bond strengths, with the film laminated with a water based adhesive having a bond strength of 437 grams, the film laminated with a solvent based adhesive having a bond strength of 44 g, and the film laminated with a polyethylene melt adhesive having a bond strength of 155 g.

EXAMPLE 5

Example 5 represents another film structure according to a further embodiment of the present invention, incorporating a wax into the core of a three layer film structure having a polypropylene homopolymer core layer, an ethylene-propylene-butene terpolymer layer on one surface of the core layer, and an ethylene-vinyl acetate copolymer on the other surface of the core layer.

Three separate three layer film products were prepared each as follows: A polypropylene homopolymer resin was blended with 6% of a Fischer Tropsch wax having a melting point of 80° C. This polypropylene/wax resin blend was co-extruded with an ethylene-propylene-butene terpolymer resin and an ethylene-vinyl acetate copolymer resin, to form a three layer base film structure having a polypropylene homopolymer core layer incorporating 6% wax therein, an ethylene-propylene-butene terpolymer surface layer on one surface of the core layer, and an ethylene-vinyl acetate copolymer on the other surface of the core layer. The core layer represents 85% of the total thickness of the three layer base film structure, the ethylene-propylene copolymer surface layer represents 10% of the total thickness of the three layer base film structure, and the ethylene-vinyl acetate copolymer surface layer represents 5% of the total thickness of the three layer base film structure. The three layer base film structure was biaxially oriented 4–5 times in the machine direction and 8–10 times in the transverse direction as is well known in the art, to produce the clear three layer film product.

Subsequent to this orientation, each of the three separate three layer film products thus produced were laminated to a two-sided treated oriented polypropylene film of 50 gauge thickness, the first using a water based adhesive, the second using a solvent based adhesive, and the third using a polyethylene melt adhesive.

The three laminated film products were then aged in a hot room at 120° F. and ambient humidity for a period of 72 hours, and tested for water vapor transmission according to ASTM method F124-90, and bond strength according to Mobil method NAF-OPP-4.10-QCT-3-416.

The film products which were laminated with a water based adhesive and a solvent based adhesive demonstrated excellent water vapor transmission rates of 0.13 g/100 in$^2$/day and 0.15 g/100 in$^2$/day, respectively, while the film product laminated with a polyethylene melt adhesive demonstrated a marginally acceptable water vapor transmission rate of 0.22 g/100 in$^2$/day. Further, all of the three laminated film products demonstrated excellent bond strengths, with the film laminated with a water based adhesive having a bond strength of 499 grams, the film laminated with a solvent based adhesive having a bond strength of greater than 600 g, and the film laminated with a polyethylene melt adhesive having a bond strength of greater than 450 g.

A comparison of the results of Examples 1–2 representing film structures prepared according to the prior art, with the results of Examples 3–5, representing film structures prepared according to the present invention, demonstrates that the films of the present invention exhibit bond strengths which are far superior to the film structures of the prior art, while maintaining water vapor transmission rates which are comparable with the film structures of the prior art.

While the invention has been thus described in terms of specific embodiments, those skilled in the art will recognize that various modifications and variations can be made without departing from the spirit and scope of this invention. Such modifications and variations are considered to be within the purview and scope of the appended claims.

What is claimed is:
1. A multilayer oriented film comprising:
   a polyolefin core layer having incorporated a wax therein;
   a first surface layer comprising a polyolefin copolymer or terpolymer layer; and a second surface layer comprising a polar layer having ester functionality, wherein said second surface layer is selected from the group consisting of ethylene vinyl acetate copolymer and anhydride-grafted polypropylene.

2. A multilayer oriented film as in claim 1, wherein said polyolefin core layer is polypropylene.

3. A multilayer oriented film as in claim 1, wherein said wax is a Fischer Tropsch wax.

4. A multilayer oriented film as in claim 1, wherein said wax is present in an amount of about 4% to about 8% by weight of said polyolefin core layer.

5. A multilayer oriented film as in claim 1, wherein said first surface layer is ethylene/propylene copolymer.

6. A multilayer oriented film as in claim 1, wherein said first surface layer is ethylene/propylene/butene terpolymer.

7. A multilayer oriented film as in claim 1, wherein said film is biaxially oriented.

8. A multilayer oriented film as in claim 1, wherein the multilayer oriented film further comprises at least one tie layer.

9. A multilayer oriented film as in claim 8, wherein the at least one tie layer comprises a polyolefin copolymer or terpolymer layer.

10. A multilayer oriented film having improved barrier properties comprising a film structure formed by a process comprising:

providing a first polyolefin resin having incorporated a wax therein, a second polyolefin copolymer or terpolymer resin, and a third polyolefin resin of a polar material having ester functionality;

co-extruding said first polyolefin resin, said second polyolefin resin and said third polyolefin resin to form a multilayer base film having (i) a polyolefin core layer, the core layer including said wax and having a first surface and a second surface, (ii) a copolymer or terpolymer surface layer on said first surface of said polyolefin core layer, and (iii) a polar surface layer having ester functionality on said second surface layer of said polyolefin core layer; and biaxially orienting said multilayer base film at conditions sufficient to cause said wax to migrate from said polyolefin core layer to the copolymer or terpolymer surface layer of said film, wherein said third polyolefin resin of a polar material having ester functionality is selected from the group consisting of ethylene vinyl acetate copolymer and anhydride-grafted polypropylene.

11. A method of forming a multilayer oriented film having improved barrier properties comprising:

providing a first polyolefin resin having incorporated a wax therein, a second polyolefin copolymer or terpolymer resin, and a third polyolefin resin of a polar material having ester functionality;

co-extruding said first polyolefin resin, said second polyolefin resin and said third polyolefin resin to form a multilayer base film having (i) a polyolefin core layer, the core layer including said wax and having a first surface and a second surface, (ii) a copolymer or terpolymer surface layer on said first surface of said polyolefin core layer, and (iii) a polar surface layer having ester functionality on said second surface layer of said polyolefin core layer; and biaxially orienting said multilayer base film at conditions sufficient to cause said wax to migrate from said polyolefin core layer to the copolymer or terpolymer surface layer of said film, wherein said third polyolefin resin of a polar material having ester functionality is selected from the group consisting of ethylene vinyl acetate copolymer and anhydride-grafted polypropylene.

* * * * *